(12) United States Patent
Saruwatari

(10) Patent No.: US 6,535,340 B1
(45) Date of Patent: Mar. 18, 2003

(54) OPTICAL ELEMENT AND PICTURE TAKING SYSTEM INCLUDING THE OPTICAL ELEMENT

(75) Inventor: Hiroshi Saruwatari, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/157,499

(22) Filed: Sep. 21, 1998

(30) Foreign Application Priority Data

Sep. 22, 1997 (JP) .............................................. 9-275140

(51) Int. Cl.$^7$ ................................................ G02B 5/04
(52) U.S. Cl. ...................... 359/834; 359/858; 359/859; 359/861; 359/633; 359/729; 359/731
(58) Field of Search ................................ 359/831, 833, 359/834, 837, 850, 857, 858, 859, 860, 861, 865, 630, 631, 633, 727, 729, 730, 731

(56) References Cited

U.S. PATENT DOCUMENTS 5,995,287 A * 11/1999 Sekita .......................... 359/599

* cited by examiner

*Primary Examiner*—Cassandra Spyrou
*Assistant Examiner*—Euncha Cherry
(74) *Attorney, Agent, or Firm*—Fitzpatrick, Cella, Harper & Scinto (57) ABSTRACT

When n is taken as integers of 2 or more, n reflecting systems are constituted by providing reflecting mirrors on opposite (two) side surfaces in 2n side surfaces of a transparent body having the shape of a 2n-sided prism. The n reflecting systems are provided on each pair of opposite side surfaces, and images of an object are formed using each of the n reflecting systems.

52 Claims, 6 Drawing Sheets

OPTICAL ELEMENT AND PICTURE TAKING SYSTEM INCLUDING THE OPTICAL ELEMENT

BACKGROUND OF THE INVENTION

1. Field of the Invention

The present invention relates to an optical element and a picture taking system including the optical element that is particularly suitable for a video camera, a still video camera, and a copying machine.

2. Description of the Related Art

Figure 10:
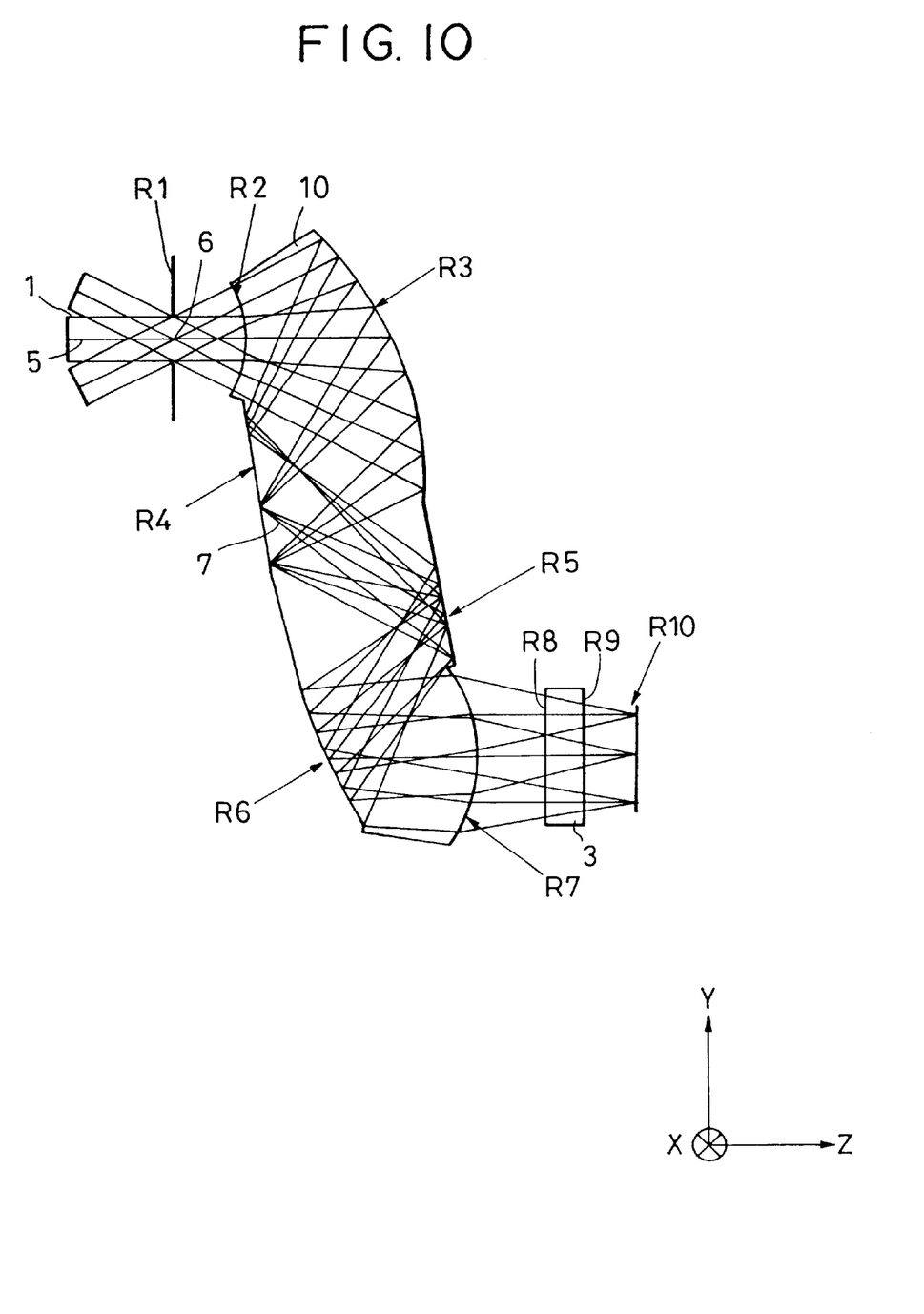
FIG. 10 schematically illustrates a main part of a conventional optical element.

FIG. 10 schematically illustrates a main part of an optical system disclosed in Japanese Patent Laid-Open No. 8-292371.

Referring to FIG. 10, there is provided an optical element 10 including a transparent body formed of glass or plastic, having a plurality of curved reflecting surfaces provided on the surface thereof.

On the surface of the optical element 10, there are formed, in the order of passage of light from an object, a concave refracting surface (incident surface) R2 having a negative refractive power, four reflecting surfaces of concave mirror R3, reflecting mirrors R4 and R5, a concave mirror R6, and a convex refracting surface (emergent surface) R7 having a positive refractive power. In FIG. 10, there are shown a diaphragm (entrance pupil) R1 disposed on the object side of the optical element 10, an optical correcting plate 3, such as a quartz low-pass filter, an infrared filter, or the like, a final image forming surface R10 on which an image pick-up surface (light receiving surface) of an image pick-up element (image pick-up medium) such as a CCD is located, and a reference axis 5 of the optical system.

Both the refracting surfaces R2 and R7 are rotary symmetrical spherical surfaces, and all the reflecting surfaces R3 to R6 are aspheric surfaces symmetrical with respect to only a YZ plane.

An image forming operation of the optical element 10 will now be described. Of the light flux 1 from an object, the amount of incident light is regulated by the diaphragm R1, and then enters the incident surface R2 of the optical element 10, is reflected by the surfaces R3 and R4, temporarily forms an image near the surface R4, is reflected from the surfaces R5 and R6, and is emitted from the emergent surface R7 to form an image again on the final image forming surface R10 via the optical correcting plate 3. As described above, the light from the object temporarily forms an image near the surface R4, while the light of the entrance pupil R1 temporarily forms an image between the surfaces R5 and R6.

The direction of the reference axis entering the optical element 10 and that emitting therefrom are parallel to and the same as each other. In addition, all of the reference axes including the incident reference axis and emergent reference axis are given in FIG. 10 (on the YZ plane).

The optical element 10 serves as a lens unit having a desired optical performance and a positive refractive power overall by virtue of the refractive power (φ=1/f; φ: power, f: focal length) of the incident and emergent surfaces R2 and R7, and the refractive powers of the concave reflecting mirrors R3 and R6.

In addition, the optical element 10 collects light fluxes from the object existing in one direction (left side on the plane of the drawing), and forms the image thereof on the final image forming surface R10.

It is convenient that pictures of an object located in another direction, for example, in a direction perpendicular to the plane of the drawing (the X direction) can be taken as in the state of FIG. 10 without rotating the optical element 10 around an axis of rotation in the Y direction.

In addition, it is also convenient that pictures of objects located in the same direction can be easily taken by substantially one optical element with different magnification.

SUMMARY OF THE INVENTION

It is an object of the present invention to provide a convenient optical element and a picture taking system having the convenient optical element.

According to an aspect of the present invention, there is provided an optical element including a plurality of curved reflecting portions, the reflecting portions reflecting light entered into the optical element, thereby transmitting the light inside the optical element, wherein the reflecting portions include a plurality of reflecting portion groups, and the reflecting portion groups form optical paths that are different from each other.

According to another aspect of the present invention, there is provided an optical element including a plurality of curved reflecting portions, the reflecting portions reflecting light entered into the optical element from a light incident portion, thereby transmitting the light inside the optical element, wherein the reflecting portions include a plurality of reflecting portion groups, and the reflecting portion groups have different optical characteristics.

In each of the above optical elements, the reflecting portions may be provided on 2n(n=integers of 2 or more) side surfaces (inner surfaces when body is hollow) of at least one of a solid body and a hollow body having the shape of a 2n-sided prism (n=integers of 2 or more), respectively, and the reflecting portion groups may be constructed by the reflecting portions provided on each pair of opposite side surfaces (inner surfaces when the body is hollow).

In addition, in each of the above optical elements, each of the reflecting portion groups may include a light incident portion and a light emergent portion; the reflecting portion groups may include a common reflecting portion and light incident portion, and the common reflecting portion and light incident portion may be rotatable together; and the reflecting portion groups may include a common final reflecting portion and light emergent portion, and the common final reflecting portion and light emergent portion may be rotatable together.

Furthermore, in each of the above optical elements, at least one of the light incident portion and the light emergent portion may include a curved surface that forms a spherical lens or an aspheric lens.

Still furthermore, in each of the above optical elements, each of the reflecting portions may include a rotary asymmetrical aspheric reflecting surface.

According to the present invention, there is provided a picture taking optical system including any one of the above optical elements, and a picture taking apparatus including the picture taking optical system and at least one of an image pick-up element and an image pick-up medium.

Further objects, features and advantages of the present invention will become apparent from the following description of the preferred embodiments with reference to the attached drawings.

DESCRIPTION OF THE PREFERRED EMBODIMENTS

Figure 1:
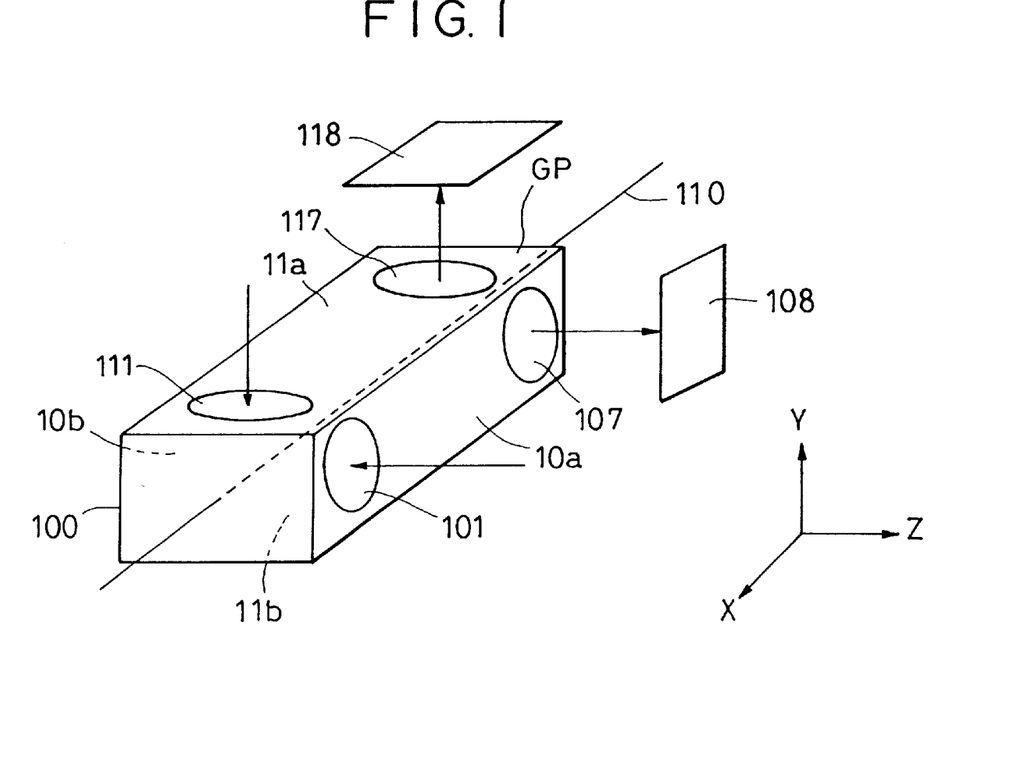
FIG. 1 is a main part external view of a first embodiment of a picture taking system having an optical element of the present invention.

FIG. 1 is a main part external view of a first embodiment of a picture taking system including an optical element of the present invention.

Figure 2:
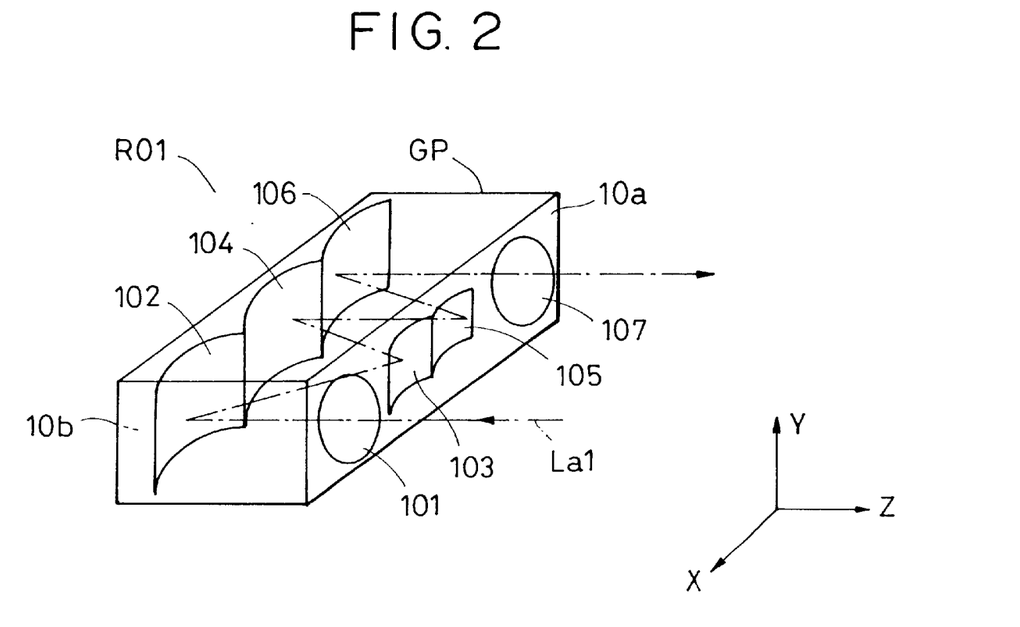
FIG. 2 illustrates the optical element shown in FIG. 1.
Figure 3:
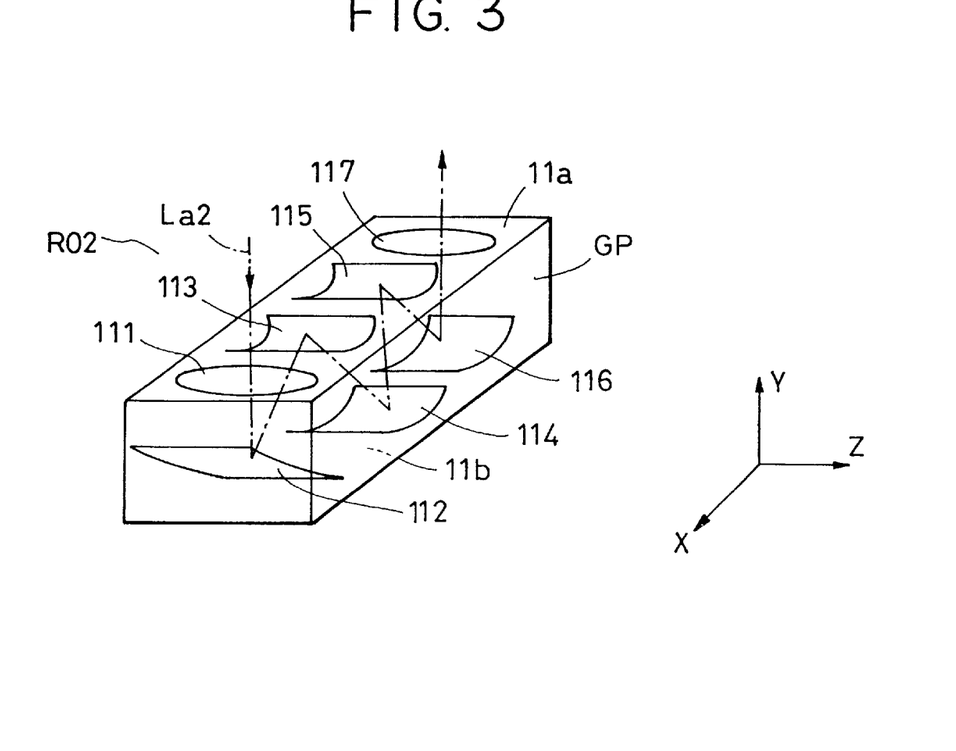
FIG. 3 illustrates the optical element shown in FIG. 1.

Referring to FIG. 1, there is provided an optical element 100, and image pick-up elements 108 and 118 are provided near light emergent surfaces 107 and 117, respectively, of the optical element 100. FIG. 2 schematically illustrates an optical path of a first reflecting system R01 that is set with respect to the XZ plane of the optical element 100 of FIG. 1, and FIG. 3 schematically illustrates an optical path of a second reflecting system R02 that is set with respect to the XY plane of the optical element 100 of FIG. 1. The optical element 100 of this embodiment employs a transparent body GP having the shape of a rectangular parallelepiped. The transparent body GP is formed of glass or plastic.

As will be understood from FIG. 2, the optical element includes a refracting surface 101 on which light flux is dent, a plurality of (five in FIG. 2, but the number is limited thereto) reflecting surfaces 102 to 106 each having curvature, and a refracting surface 107 from which the light flux reflected by the reflecting surfaces is emitted, provided on the surfaces of the opposite side surfaces 10a and 10b of the transparent body GP, thereby constructing the first reflecting system R01 in which light La1 is on an optical path in the XZ plane.

In the first reflecting system R01 of FIG. 2, the light flux from the object (not shown) located in the Z direction is guided to an image pick-up element 108 via the refracting surface 101, reflecting surfaces 102 to 106 and the refracting surface 107, and an object image is formed by the light flux on the image pick-up surface.

As will be understood from FIG. 3, the optical element 100 includes a refracting surface 111 on which light flux is incident, a plurality of (five in FIG. 3, but the number is not limited thereto) reflecting surfaces 112 to 116 each having curvature, and a refracting surface 117 from which the light flux reflected by the reflecting surfaces is emitted, provided on the surfaces of the opposite side surfaces 11a and 11b of the transparent body GP, thereby constructing the second reflecting system R02 in which light La2 is on an optical path in the XY plane.

In the second reflecting system R02 of FIG. 3, the light flux from the object (not shown) located in the Y direction is guided to an image pick-up element 118 via the refracting surface 111, reflecting surfaces 112 to 116 and the refracting surface 117, and an object image is formed by the light flux on the image pick-up surface.

The optical operation of the first reflecting system R01 shown in FIG. 2 and that of the second reflecting system R02 are completely separated. Therefore, it is also possible to construct the first and second reflecting systems R01 and R02 by optical systems in which optical parameters (optical characteristics) such as focal length, image taking view angle, and the like are different from each other.

For example, by allowing the reflecting systems R01 and R02 to differ from each other in the focal length, the optical element 100 can be used as a double-focus lens. According to this embodiment, an optical system having a far-reduced size and thickness can be achieved as compared with an optical system of a type of switching an attachment and a turret seen in a conventional coaxial optical system.

In addition, by constructing the reflecting surfaces of the reflecting systems R01 and R02 so that they have a different reflectance, the reflecting systems R01 and R02 may differ from each other in terms of total transmittance. With this construction, selection of either of the reflecting systems according to luminance of the object eliminates the need for mechanical switching such as driving of the diaphragm and insertion of a ND filter, and a combination of either of the reflecting systems and a mechanical shutter or a electrical shutter of the image pick-up element enables pictures to be taken in a wide range of exposures.

Further, the F-number at the time of design may be varied between the reflecting systems R01 and R02. In this case, the depth of field can be varied in addition to the effect of the above step-by-step exposure switching, enabling a greater variety of types of pictures to be taken.

Still further, image pick-up elements having different aspect ratios may be used for the image pick-up elements 108 and 118. This allows images of differing aspect ratio to be easily obtained.

In this embodiment, one of the image pick-up elements 108 and 118 may be omitted, and the remaining one image pick-up element may be rotated around the axis 110 of the optical element 100.

Figure 4:
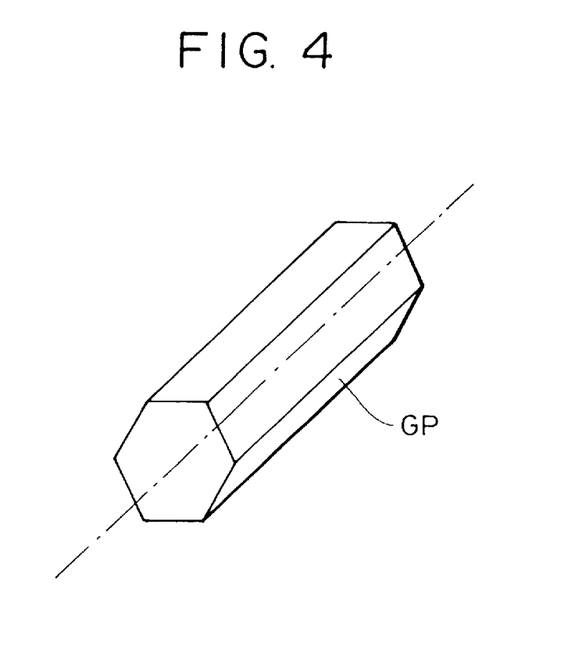
FIG. 4 illustrates another configuration of the embodiment of the optical element of the present invention.

The shape of the transparent body GP and the number of the reflecting systems provided thereon are not limited to those of the transparent body GP shown in FIG. 1. For example, first to third reflecting systems may be provided on each of the opposite side surfaces of a transparent body GP having the shape of a hexagonal prism, as shown in FIG. 4.

Figure 5:
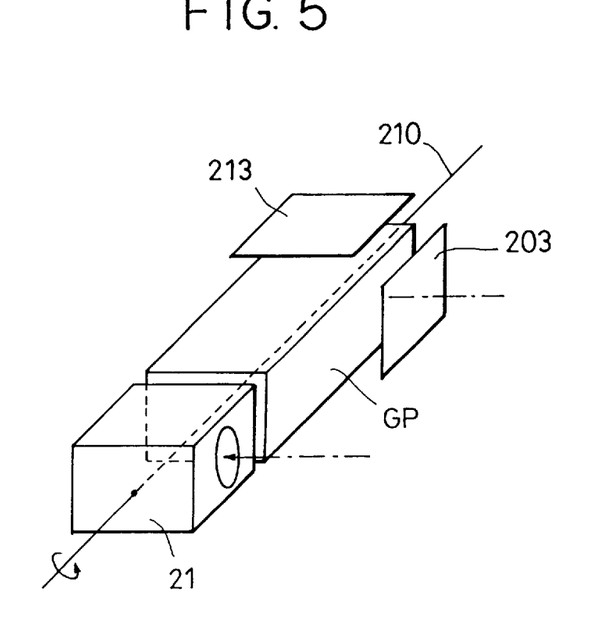
FIG. 5 is a main part external view of a second embodiment of a picture taking system having an optical element of the present invention.
Figure 6:
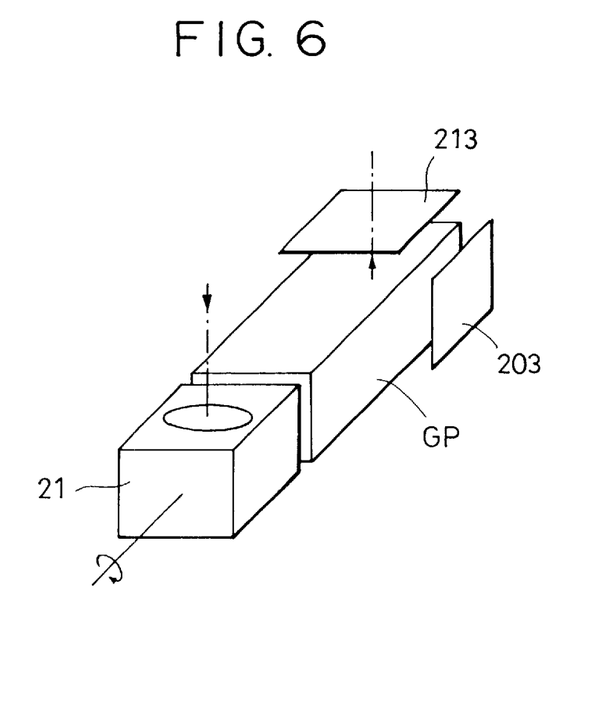
FIG. 6 is another main part external view of the second embodiment of a picture taking system having an optical element of the present invention.

FIGS. 5 and 6 are main part external views each showing a second embodiment of the picture taking system having the optical element of the present invention.

The second embodiment differs from the first embodiment of FIG. 1 in that an optical member 21 is produced by separating the refracting surface 101 and only the reflecting surface 102 from the optical element 100 and by combining these surfaces, and the optical member 21 is rotatably provided with respect to the center axis 210 of the transparent body GP in the direction shown by the arrows in FIGS. 5 and 6.

Light flux from the object in the Z direction (FIG. 5) and light flux from the object in the Y direction (FIG. 6) are selectively taken in and guided to the transparent body GP, thereby being guided to the corresponding image pick-up element 203 or 213.

Figure 7:
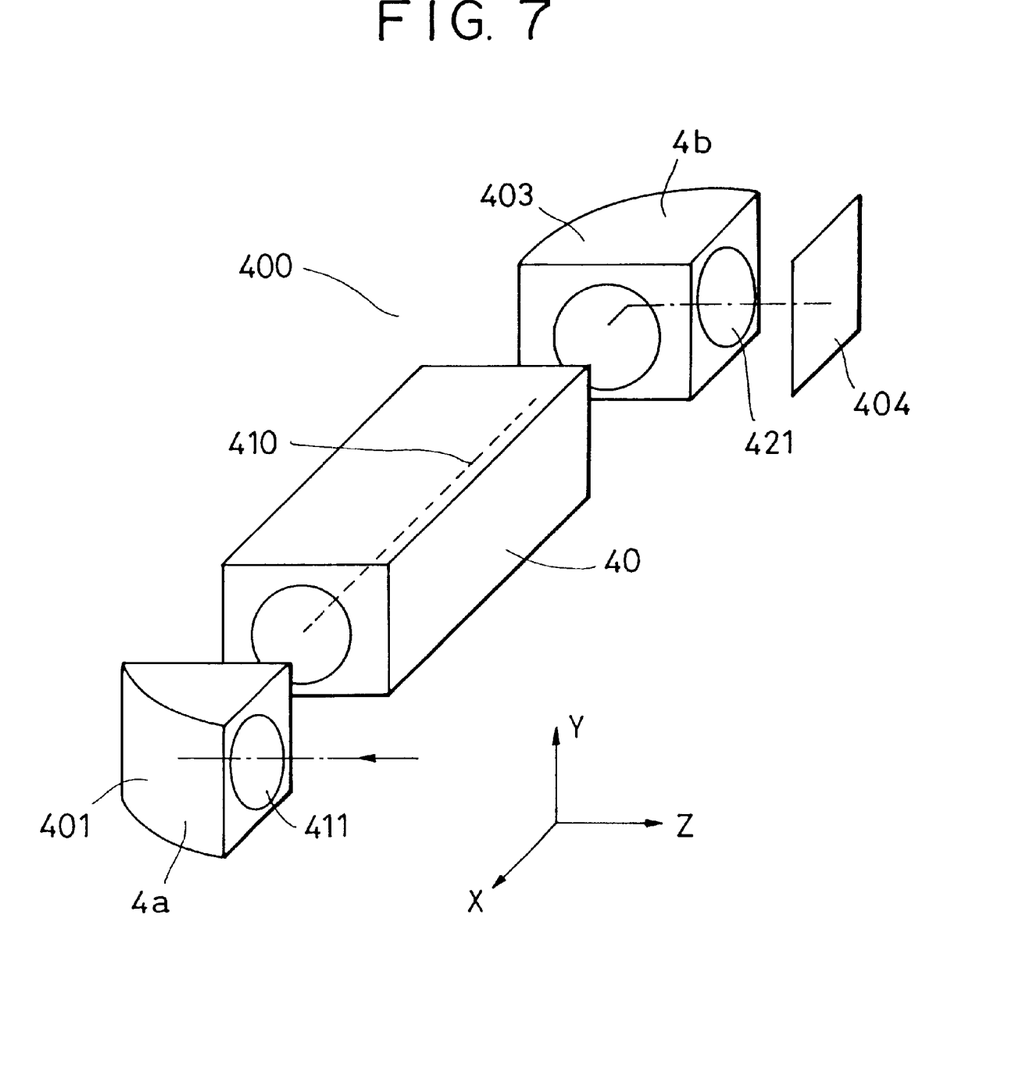
FIG. 7 is a main part external view of a third embodiment of a picture taking system having an optical element of the present invention.
Figure 8:
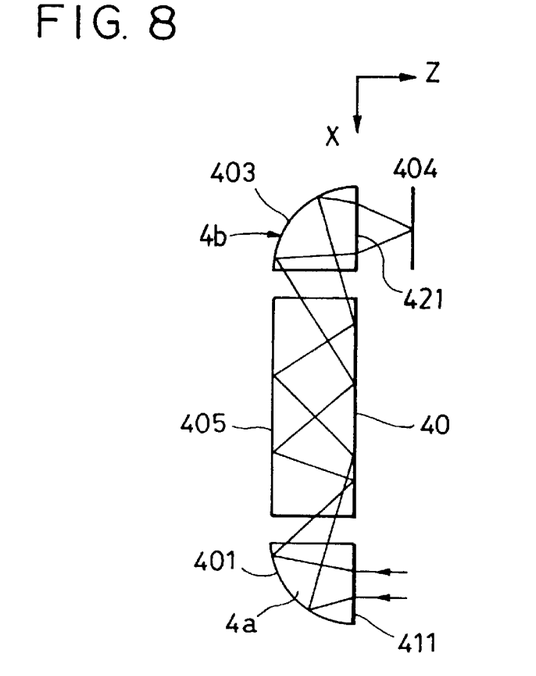
FIG. 8 illustrates one cross-sectional view of FIG. 7.
Figure 9:
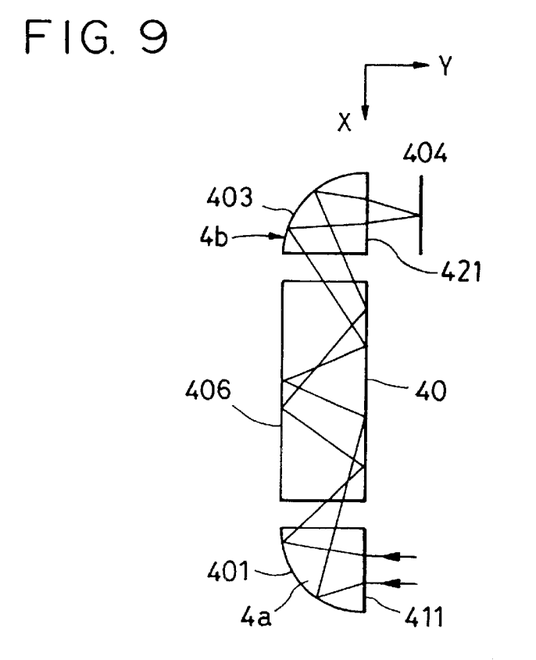
FIG. 9 illustrates another cross-sectional view of FIG. 7.

FIGS. 7, 8 and 9 are main part external views each showing a third embodiment of the picture taking system having the optical element of the present invention.

Referring to the drawings, numeral 400 denotes an optical element, and first and second reflecting systems 405 and 406 each having a plurality of reflecting mirrors similar to those shown in FIGS. 2 and 3 are provided in a transparent body 40 that constitutes a part of the optical element 400.

In this embodiment, an optical member 4a that is a combination of a refracting surface 411 (corresponding to the refracting surface 101 or 111 of FIG. 1) on which the light flux from the object is incident, and a reflecting surface 401 (corresponding to the reflecting surfaces 102 and 112) for reflecting the light incident from the refracting surface 411 is rotatably provided with respect to an axis 410 in opposition to one surface of the transparent body 40.

In addition, an optical member 4b that is a combination of a reflecting surface 403 (corresponding to the reflecting surfaces 106 and 116 of FIG. 1) for reflecting the light flux emitted from the transparent body 40, and a refracting surface 421 (corresponding to the refracting surface 107 or 117) for emitting the light flux from the reflecting surface 403 is rotatably provided with respect to the axis 410 in opposition to the other surface of the transparent body 40.

Furthermore, one image pick-up element 404 is provided in the emergent direction of the refracting surface 421 so as to be rotated together with the optical member 4b.

In the state shown in FIG. 7, light flux from the object (not shown) located in the Z direction is, as shown in FIG. 8, incident on the transparent body 40 via the refracting surface 411 of the optical member 4a, and the reflecting surface 401, is reflected from a plurality of reflecting mirrors of the first reflecting system 405 provided within the XZ plane in the transparent body 40 similarly to the optical element 100 of FIG. 2, is emitted from the transparent body 40, and then guided to the image pick-up element 404 via the reflecting surface 403 of the optical member 4b and the refracting surface 421, and an object image is formed on the image pick-up surface by the light flux.

FIG. 9 illustrates the optical members 4a and 4b and the image pick-up element 404 that are rotated 90° in a counterclockwise direction using the axis 410 as an axis of rotation in the state of FIG. 7.

In FIG. 9, light flux from the object (not shown) located in the Y direction is reflected by a plurality of reflecting mirrors of the second reflecting system 406 provided within the XY plane in the transparent body 40 similarly to optical element 100 of FIG. 3 via the refracting surface 411 of the optical member 4a and the reflecting surface 401, is emitted from the transparent body 40, and then guided to the image pick-up element 404 via the reflecting surface 403 of the optical member 4b and the refracting surface 421, and an object image is formed on the image pick-up surface by the light flux.

An optical element having a plurality of reflecting systems as described above offers the following advantages.

(A) It is possible to easily take pictures of an object located in any of a plurality of directions.

(B) It is possible to easily obtain a plurality of picture-taking modes.

(C) Pictures can be taken with different optical characteristics (focal length, total transmittance, F-number, and picture-taking aspect ratio), and various types of images can be obtained.

(D) Since pictures can be taken with a plurality of focal lengths, images of different view angles can be obtained without an additional attachment or a complicated zoom mechanism.

(E) The optical element has reflecting systems of different total transmittance and F-number, whereby step-by-step exposure control can be easily effected.

(F) By varying the picture-taking aspect ratio between the reflecting systems, the optical element can respond to a greater variety of picture-taking formats.

(G) The adoption of an off-axis optical system enables an optical system to be reduced in thickness and size, as compared with a coaxial optical system.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An optical element, comprising:
a plurality of curved reflecting portions, said reflecting portions reflecting light entered into said optical element, thereby transmitting the light inside said optical element, wherein said reflecting portions include a plurality of reflecting portion groups, and said reflecting portion groups form optical paths that are different from each other.

2. An optical element according to claim 1, wherein each of said reflecting portion groups includes a light incident portion and a light emergent portion.

3. An optical element according to claim 1, wherein said reflecting portion groups include a common reflecting portion and light incident portion, and said common reflecting portion and light incident portion are rotatable together.

4. An optical element according to claim 3, wherein said reflecting portion groups include a common final reflecting portion and light emergent portion, and said common final reflecting portion and light emergent portion are rotatable together.

5. An optical element according to any one of claims 2 to 4, wherein at least one of said light incident portion and said light emergent portion includes a curved surface.

6. An optical element according to claim 1, wherein each of said reflecting portions includes a rotary asymmetrical aspheric reflecting surface.

7. An optical element, comprising:
a plurality of curved reflecting portions, said reflecting portions reflecting light entered into said optical element from a light incident portion, thereby transmitting the light inside said optical element, wherein said reflecting portions include a plurality of reflecting portion groups defining different optical paths, and said reflecting portion groups have different optical characteristics.

8. An optical element according to claim 7, wherein each of said reflecting portion groups includes a light incident portion and a light emergent portion.

9. An optical element according to claim 7, wherein said reflecting portion groups include a common reflecting portion and light incident portion, and said common reflecting portion and light incident portion are rotatable together.

10. An optical element according to claim 9, wherein said reflecting portion groups include a common final reflecting portion and light emergent portion, and said common final reflecting portion and light emergent portion are rotatable together.

11. An optical element according to any one of claims 8 to 10, wherein at least one of said light incident portion and said light emergent portion includes a curved surface.

12. An optical element according to claim 7, wherein each of said reflecting portions includes a rotary asymmetrical aspheric reflecting surface.

13. An optical element according to claim 1 or 7, wherein said reflecting portions are provided on 2n (n=integers of 2 or more) side surfaces (inner surfaces when body is hollow) of at least one of a solid body and a hollow body having the shape of a 2n-sided prism (n=integers of 2 or more), respectively, and said reflecting portion groups are constructed by said reflecting portions provided on each pair of opposite side surfaces (inner surfaces when the body is hollow).

14. An optical system including an optical element, said optical element comprising a plurality of curved reflecting portions, said reflecting portions reflecting light entered into said optical element, thereby transmitting the light inside said optical element, wherein said reflecting portions include a plurality of reflecting portion groups, and said reflecting portion groups form optical paths that are different from each other.

15. An optical system according to claim 14, wherein each of said reflecting portion groups includes a light incident portion and a light emergent portion.

16. An optical system according to claim 14, wherein said reflecting portion groups include a common reflecting portion and a light incident portion, and said common reflecting portion and light incident portion are rotatable together.

17. An optical system according to claim 16, wherein said reflecting portion groups include a common final reflecting portion and a light emergent portion, and said common final reflecting portion and light emergent portion are rotatable together.

18. An optical system according to any one of claims 15 to 17, wherein at least one of said light incident portion and said light emergent portion includes a curved surface.

19. An optical system according to claim 14, wherein each of said reflecting portions includes a rotary asymmetrical aspheric reflecting surface.

20. An optical system including an optical element, said optical element comprising a plurality of curved reflecting portions, said reflecting portions reflecting light entered into said optical element from a light incident portion, thereby transmitting the light inside said optical element, wherein said reflecting portions include a plurality of reflecting portion groups defining different optical paths, and said reflecting portion groups have different optical characteristics.

21. An optical system according to claim 20, wherein each of said reflecting portion groups includes a light incident portion and a light emergent portion.

22. An optical system according to claim 20, wherein said reflecting portion groups include a common reflecting portion and a light incident portion, and said common reflecting portion and light incident portion are rotatable together.

23. An optical system according to claim 22, wherein said reflecting portion groups include a common final reflecting portion and a light emergent portion, and said common final reflecting portion and light emergent portion are rotatable together.

24. An optical system according to any one of claims 21 to 23, wherein at least one of said light incident portion and said light emergent portion includes a curved surface.

25. An optical system according to claim 20, wherein each of said reflecting portions includes a rotary asymmetrical aspheric reflecting surface.

26. An optical system according to claim 14 or 20, wherein said reflecting portions are provided on 2n (n=integers of 2 or more) side surfaces (inner surfaces when body is hollow) of at least one of a solid body and a hollow body having the shape of a 2n-sided prism (n=integers of 2 or more), respectively, and said reflecting portion groups are constructed by said reflecting portions provided on each pair of opposite side surfaces (inner surfaces when the body is hollow).

27. A picture-taking optical system including an optical element, said optical element comprising a plurality of curved reflecting portions, said reflecting portions reflecting light entered into said optical element, thereby transmitting the light inside said optical element, wherein said reflecting portions include a plurality of reflecting portion groups, and said reflecting portion groups form optical paths that are different from each other.

28. A picture-taking optical system according to claim 27, wherein each of said reflecting portion groups includes a light incident portion and a light emergent portion.

29. A picture-taking optical system according to claim 27, wherein said reflecting portion groups include a common reflecting portion and a light incident portion, and said common reflecting portion and light incident portion are rotatable together.

30. A picture-taking optical system according to claim 29, wherein said reflecting portion groups include a common final reflecting portion and a light emergent portion, and said common final reflecting portion and light emergent portion are rotatable together.

31. A picture-taking optical system according to any one of claims 28 to 30, wherein at least one of said light incident portion and said light emergent portion includes a curved surface.

32. A picture-taking optical system according to claim 27, wherein each of said reflecting portions includes a rotary asymmetrical aspheric reflecting surface.

33. A picture-taking optical system including an optical element, said optical element comprising a plurality of curved reflecting portions, said reflecting portions reflecting light entered into said optical element from a light incident portion, thereby transmitting the light inside said optical element, wherein said reflecting portions include a plurality of reflecting portion groups, defining different optical paths and said reflecting portion groups have different optical characteristics.

34. A picture-taking optical system according to claim 33, wherein each of said reflecting portion groups includes a light incident portion and a light emergent portion.

35. A picture-taking optical system according to claim 33, wherein said reflecting portion groups include a common reflecting portion and a light incident portion, and said common reflecting portion and light incident portion are rotatable together.

36. A picture-taking optical system according to claim 35, wherein said reflecting portion groups include a common final reflecting portion and a light emergent portion, and said common final reflecting portion and light emergent portion are rotatable together.

37. A picture-taking optical system according to any one of claims 34 to 36, wherein at least one of said light incident portion and said light emergent portion includes a curved surface.

38. A picture-taking optical system according to claim 33, wherein each of said reflecting portions includes a rotary asymmetrical aspheric reflecting surface.

39. A picture-taking optical system according to claim 27 or 33, wherein said reflecting portions are provided on 2n (n=integers of 2 or more) side surfaces (inner surfaces when body is hollow) of at least one of a solid body and a hollow body having the shape of a 2n-sided prism (n integers of 2 or more), respectively, and said reflecting portion groups are constructed by said reflecting portions provided on each pair of opposite side surfaces (inner surfaces when the body is hollow).

40. A picture taking apparatus, comprising: at least one of an image pick-up element and an image pick-up medium; and a picture-taking optical system which includes an optical element, said optical element comprising a plurality of curved reflecting portions, said reflecting portions reflecting light entered into said optical element, thereby transmitting the light inside said optical element, wherein said reflecting portions include a plurality of reflecting portion groups, and said reflecting portion groups form optical paths that are different from each other.

41. A picture taking apparatus according to claim 40, wherein each of said reflecting portion groups includes a light incident portion and a light emergent portion.

42. A picture taking apparatus according to claim 40, wherein said reflecting portion groups include a common reflecting portion and a light incident portion, and said common reflecting portion and light incident portion are rotatable together.

43. A picture taking apparatus according to claim 42, wherein said reflecting portion groups include a common final reflecting portion and a light emergent portion, and said common final reflecting portion and light emergent portion are rotatable together.

44. A picture taking apparatus according to any one of claims 41 to 43, wherein at least one of said light incident portion and said light emergent portion includes a curved surface.

45. A picture taking apparatus according to claim 40, wherein each of said reflecting portions includes a rotary asymmetrical aspheric reflecting surface.

46. A picture taking apparatus, comprising: at least one of an image pick-up element and an image pick-up medium; and a picture-taking optical system which includes an optical element, said optical element comprising a plurality of curved reflecting portions, said reflecting portions reflecting light entered into said optical element from a light incident portion, thereby transmitting the light inside said optical element, wherein said reflecting portions include a plurality of reflecting portion groups defining different optical paths, and said reflecting portion groups have different optical characteristics.

47. A picture taking apparatus according to claim 46, wherein each of said reflecting portion groups includes a light incident portion and a light emergent portion.

48. A picture taking apparatus according to claim 46, wherein said reflecting portion groups include a common reflecting portion and a light incident portion, and said common reflecting portion and light incident portion are rotatable together.

49. A picture taking apparatus according to claim 48, wherein said reflecting portion groups include a common final reflecting portion and a light emergent portion, and said common final reflecting portion and light emergent portion are rotatable together.

50. A picture taking apparatus according to any one of claims 47 to 49, wherein at least one of said light incident portion and said light emergent portion includes a curved surface.

51. A picture taking apparatus according to claim 46, wherein each of said reflecting portions includes a rotary asymmetrical aspheric reflecting surface.

52. A picture taking apparatus according to claim 40 or 46, wherein said reflecting portions are provided on 2n (n=integers of 2 or more) side surfaces (inner surfaces when body is hollow) of at least one of a solid body and a hollow body having the shape of a 2n-sided prism (n=integers of 2 or more), respectively, and said reflecting portion groups are constructed by said reflecting portions provided on each pair of opposite side surfaces (inner surfaces when the body is hollow).

* * * * *

UNITED STATES PATENT AND TRADEMARK OFFICE
CERTIFICATE OF CORRECTION

PATENT NO.     : 6,535,340 B1
DATED          : March 18, 2003
INVENTOR(S)    : Hiroshi Saruwatari It is certified that error appears in the above-identified patent and that said Letters Patent is hereby corrected as shown below:

Column 3,
Line 40, "dent," should read -- incident, --.
Line 41, "is limited" should read -- is not limited --.

Column 8,
Line 42, "groups," should read -- groups --; and "paths" should read -- paths, --.

Signed and Sealed this

Twenty-fifth Day of November, 2003

JAMES E. ROGAN
*Director of the United States Patent and Trademark Office*